United States Patent [19]

Kobari et al.

[11] Patent Number: 4,678,056
[45] Date of Patent: Jul. 7, 1987

[54] PART TIME FOUR WHEEL DRIVE VEHICLE WITH ROAD SURFACE CONDITION SENSOR

[75] Inventors: Yuji Kobari, Yokosuka; Keiichi Miyamoto, Yokohama, both of Japan

[73] Assignee: Nissan Motor Co., Ltd., Japan

[21] Appl. No.: 783,562

[22] Filed: Oct. 3, 1985

[30] Foreign Application Priority Data

Oct. 9, 1984 [JP] Japan ............................ 59-151700[U]

[51] Int. Cl.$^4$ .......................... B62D 1/24; B60F 17/34
[52] U.S. Cl. ..................................... 180/247; 180/167; 180/79.1
[58] Field of Search ............... 180/247, 167, 168, 169, 180/197, 233, 131, 141, 79.1; 73/146, 104, 105

[56] References Cited

U.S. PATENT DOCUMENTS

| | | | |
|---|---|---|---|
| 3,160,463 | 12/1964 | Moscarini | 180/168 |
| 4,148,027 | 4/1979 | Nowogrodzki | 73/146 |
| 4,417,641 | 11/1983 | Kageyama | 180/247 |

FOREIGN PATENT DOCUMENTS 58-56922  4/1983  Japan .
59-130985 6/1984  Japan .

Primary Examiner—John J. Love
Assistant Examiner—Donn McGiehan
Attorney, Agent, or Firm—Leydig, Voit & Mayer

[57] ABSTRACT

A four wheel drive motor vehicle is equipped with a change-over unit for selecting a four wheel drive mode or a two wheel drive mode, a road surface condition sensing sonar system, and an actuator for actuating the change-over unit to change the drive system to the four wheel drive mode when the road surface condition sensing system determines that the road surface is slippery. The road surface condition sensing means has ultrasonic transmitter and receiver, and a control unit such as a microcomputer for determining whether the intensity of waves reflected from the road surface is equal to or lower than a predetermined value.

6 Claims, 9 Drawing Figures

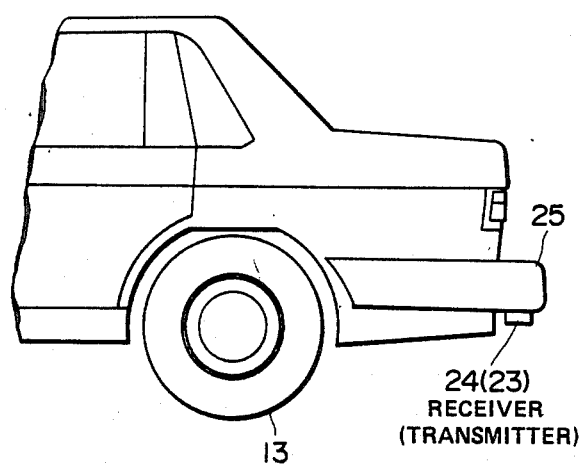
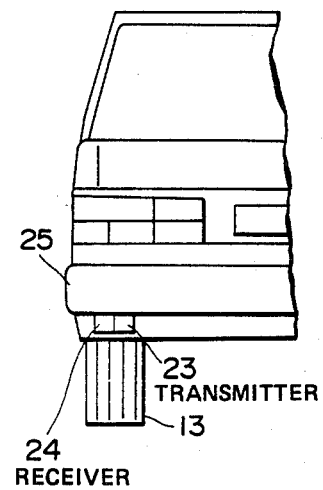
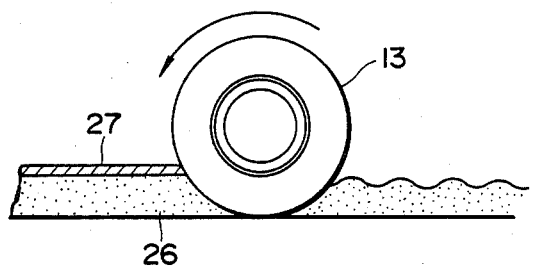

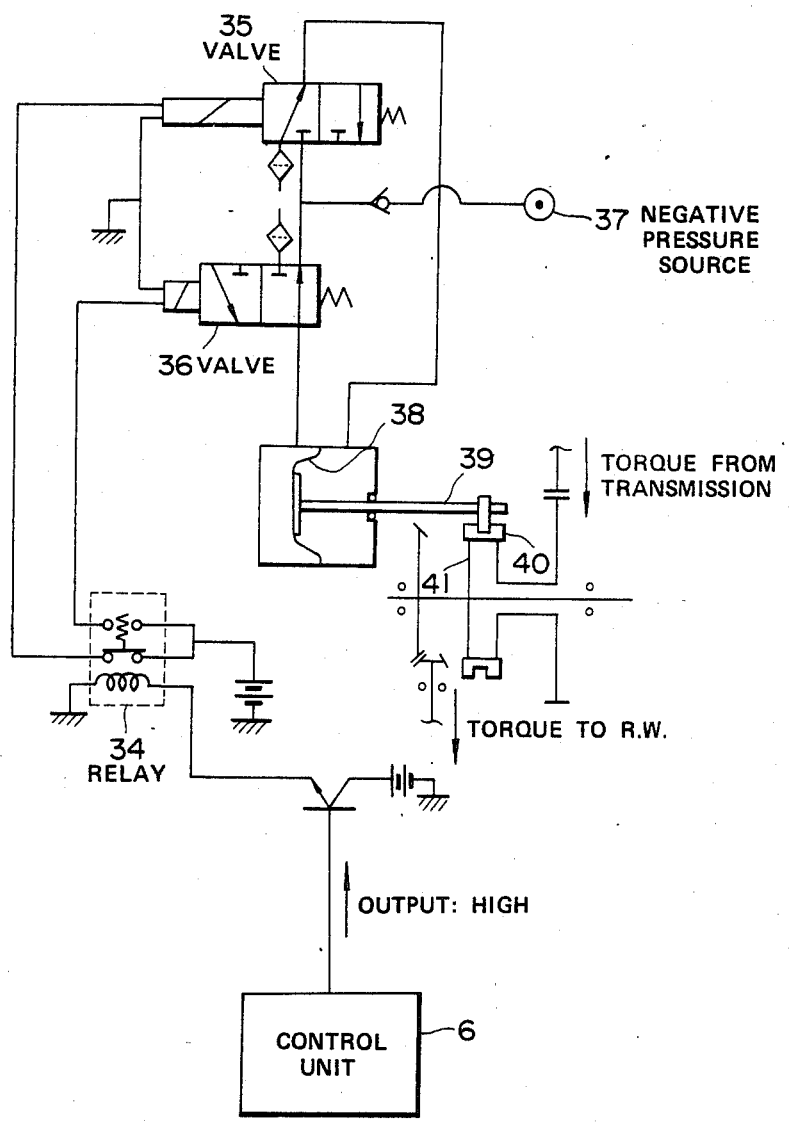

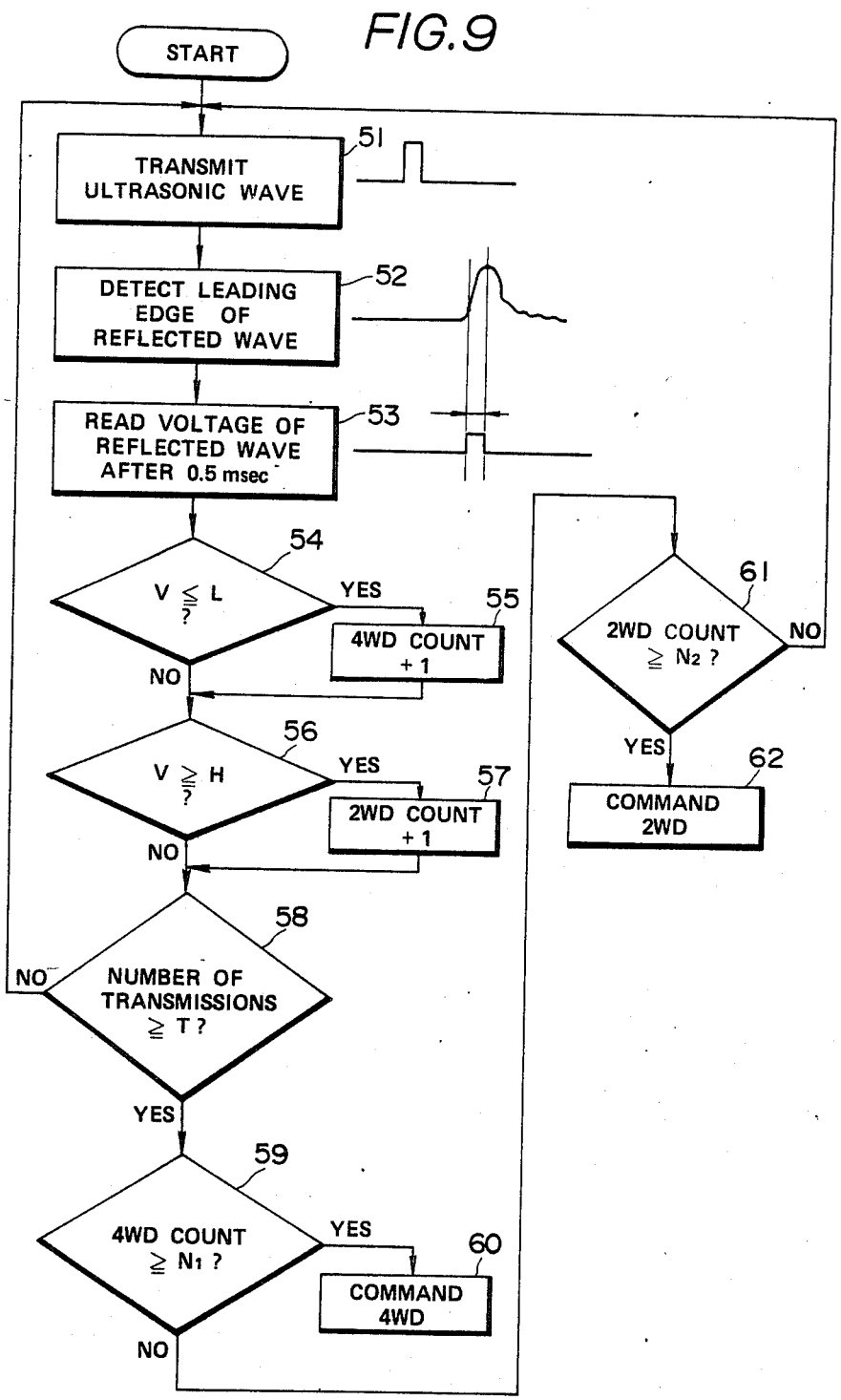

PART TIME FOUR WHEEL DRIVE VEHICLE WITH ROAD SURFACE CONDITION SENSOR

BACKGROUND OF THE INVENTION

The present invention relates to a part time four wheel drive motor vehicle.

Japanese patent provisional publication No. 58-56922 shows a conventional four wheel drive vehicle which automatically changes the drive system from a two wheel drive mode to a four wheel drive mode when the vehicle traverses a slippery road such as a snowy road. This vehicle has a means for detecting a difference of rotational speed between the front wheels and the rear wheels, and changes the drive system to the four wheel drive mode in accordance with the detected rotational speed difference.

However, this four wheel drive vehicle is unsatisfactory in that the drive system is changed to the four wheel drive mode only after the driving wheels start slipping. In this vehicle, a change to the four wheel drive mode is effected so late that the vehicle stability especially in cornering is injured, and the vehicle is apt to spin out.

SUMMARY OF THE INVENTION

It is an object of the present invention to provide a four wheel drive vehicle which can automatically change the drive system to the four wheel drive mode timely before the road wheels start slipping.

According to the present invention, a vehicle comprises an engine, first and second wheels, a four wheel drive system for transmitting power from the engine to the first and second wheels, a road surface condition sensing means and an actuator. The four wheel drive system comprises a change-over means for selectively changing the drive system from a four wheel drive mode in which power is transmitted to all of the first and second wheels to a two wheel drive mode in which power is transmitted only to the first wheels, and vice versa. The road surface condition sensing means transmits waves toward a road surface, receives waves reflected from the road surface and delivers an output signal when an intensity of the reflected waves is equal to or lower than a predetermined value. The actuators actuates the change-over means of the drive system to change the drive system from the two wheel drive mode to the four wheel drive mode when the output signal is produced by the road surface condition sensing means.

BRIEF DESCRIPTION OF THE DRAWINGS

FIG. 5 is a side view for showing a road surface condition influenced by a vehicle wheel, FIGS. 7 and 8 are schematic views for showing one example of an actuator shown in FIG. 1, and FIG. 9 is a flow chart showing one example of a control process performed by the road surface condition sensing system of FIG. 1.

DETAILED DESCRIPTION OF THE INVENTION

Figure 1:
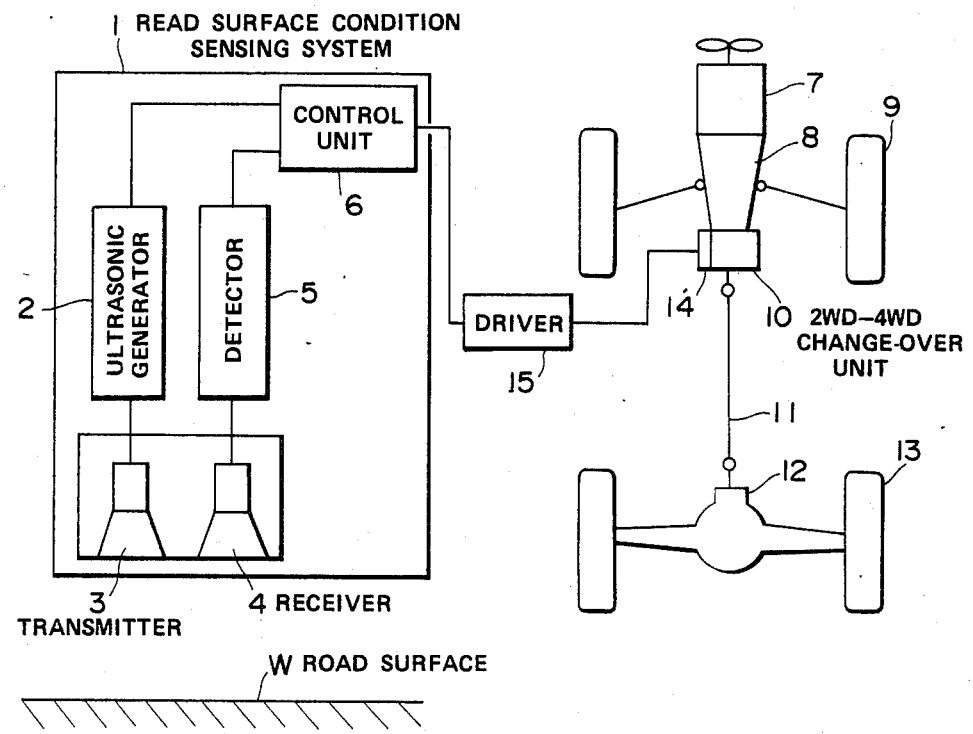
FIG. 1 is a schematic view showing a four wheel drive vehicle of one embodiment of the present invention.

One embodiment of the present invention is shown in FIG. 1. A vehicle shown in FIG. 1 is equipped with a sonar system 1 for sensing a condition of a road surface W. The sonar system 1 produces a 4WD command signal when the intensity of the reflection of waves transmitted toward the road surface W is equal to or lower than a predetermined value. The road surface condition sensing sonar system 1 is of a type described in Japanese patent application No. 59-130985 filed on June 27, 1984. The sonar system 1 has an ultrasonic generator 2, an ultrasonic transmitter 3 for emitting ultrasonic waves toward the road surface W, an ultrasonic receiver 4 for collecting reflected waves, a detector circuit 5, and a control unit 6. For example, the detector circuit 5 comprises an amplifier, a rectifier and a peak detector.

Figure 6:
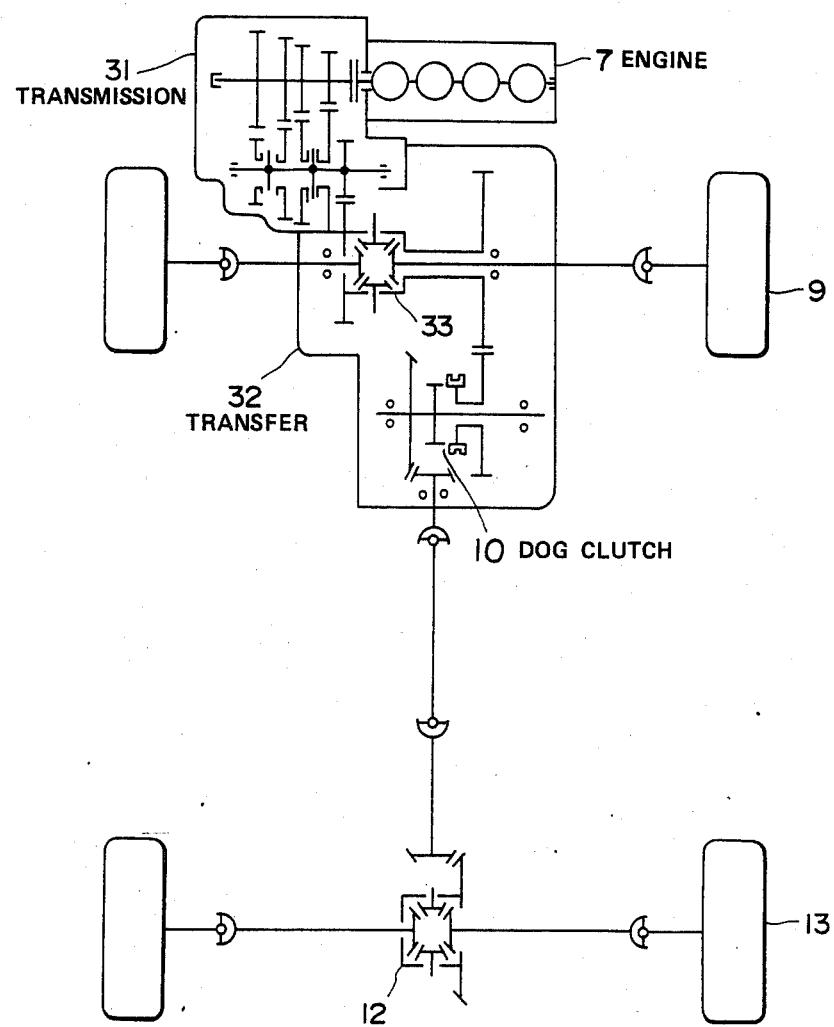
FIG. 6 is a skeleton drawing of a power train of a four wheel drive vehicle usable in the present invention.

The vehicle has an engine 7 and a transmission-transfer assembly 8. FIG. 6 shows the construction of one example of the transmission-transfer assembly. As shown in FIG. 6, the assembly consists of a transmission 31 and a transfer, (or transfer case,) 32. The transfer 32 has a front differential 33 connected between front wheels 9. As shown in FIG. 1, the transfer 32 of the assembly 8 is provided with a 2WD-4WD change-over unit 10. A rear propeller shaft 11 extends from the 2WD-4WD change-over unit 10 to a rear differential 12 connected between rear wheels 13. The 2WD-4WD change-over unit 10 makes and breaks a driving connection between the transfer 32 and the rear propeller shaft 11. Therefore, this drive system is selectively put in a 2WD state in which driving torque is transmitted only to the front wheels 9 or in a 4WD state in which driving torque is transmitted to not only the front wheels but also the rear wheels 13.

The change-over unit 10 is operated by an actuator 14, which is connected with the control unit 6 of the road surface condition sensing system 1 through a driver 15.

Figure 7:
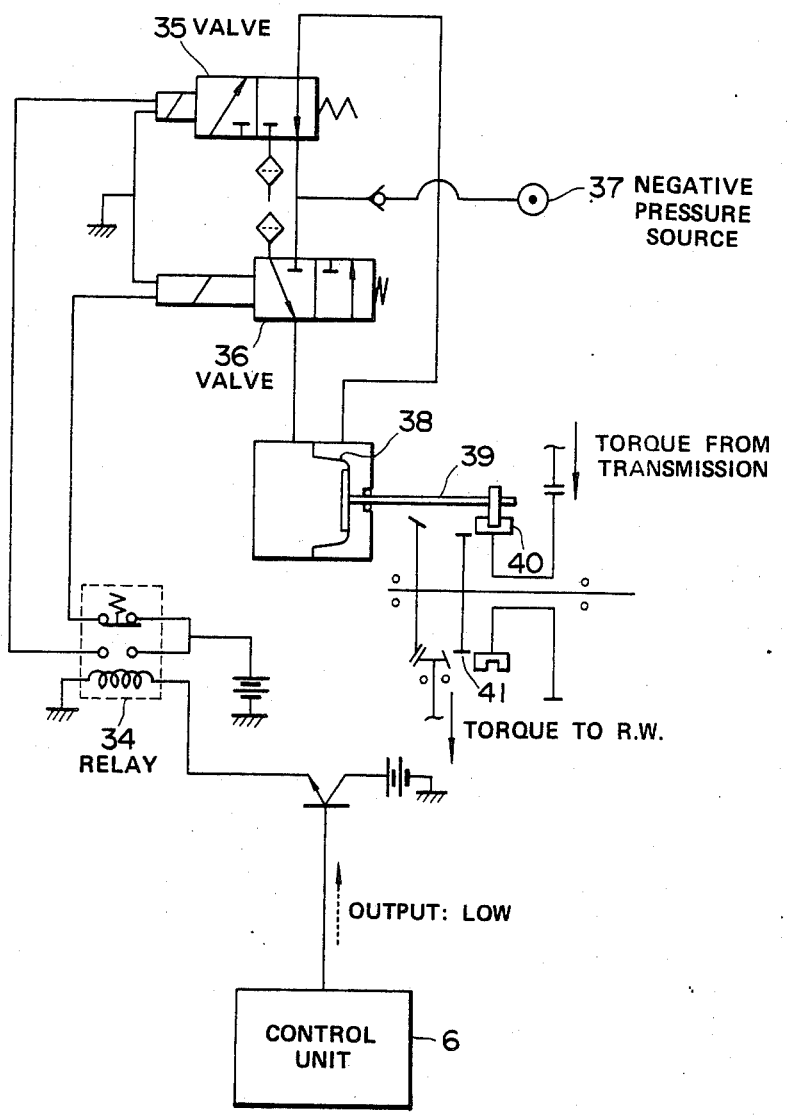

In the example of FIG. 6, the change-over unit 10 comprises a dog clutch, and is controlled by the control unit 6 through the actuator 14. FIGS. 7 and 8 show the operations of one example of the actuator 14. If the control unit 6, such as a microcomputer, determines that the friction coefficient of the road surface is high, then the control unit 6, as shown in FIG. 7, delivers an output signal which is in a low level and therefore a relay 34 is not energized. Consequently, an electromagnetic valve 36 is energized and moved rightward into a state shown in FIG. 7. Therefore, a negative pressure from a negative pressure source 37 such as an intake manifold causes a diaphragm 38 to deflect rightward and a shift rod 39 connected with the diaphragm 38 to move rightward. This rightward movement of the shift rod 39 causes a coupling sleeve 40 rotatable about a gear axis to move rightward away from a clutch 41. Therefore, a driving torque is not transmitted from the transmission to the rear wheels. That is, the driving system is in the 2WD state.

If the control unit 6 decide that the friction coefficient of the road surface is low, the output signal of the control unit 6 is changed to a high level and the relay 34 is energized, as shown in FIG. 8. Therefore, an electromagnetic valve 35 moves rightward and the electromagnetic valve 36 moves leftward as shown in FIG. 8. As a result, the diaphragm 38 is pulled leftward, and the coupling sleeve 40 and the clutch 41 are engaged with each other, so that the driving system is put in the 4WD state. In this state, the output power of the engine 7 is transmitted through the transmission 31 and the front differential 33 of the transfer 32 to the right and left front wheels 9. At the same time, the power of the engine 7 is transmitted through the 2WD-4WD change-over unit 10, the rear propeller shaft 11 and the rear differential 12 to the right and left rear wheels 13.

Figure 2:
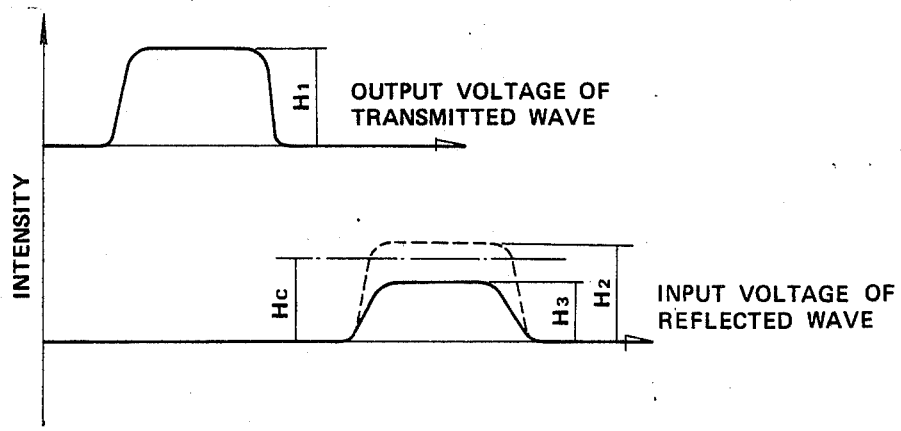
FIG. 2 is a timing chart for showing the operation of a road surface condition sensing sonar system shown in FIG. 1, FIGS. 3 and 4 are side view and rear view of a vehicle showing one example of the location of an ultrasonic transmitter-receiver.

Under the control of the control unit 6, the road surface condition sensing system 1 emits ultrasonic waves toward the road surface at regular time intervals and receives waves reflected back from the road surface. The control unit 6 monitors the intensity of the reflected waves. A relation between the output voltage of the transmitted ultrasonic wave and the input voltage of the reflected wave is shown in FIG. 2. FIG. 2 shows the intensity of the reflected wave in terms of the average value as in the above-mentioned Japanese patent application No. 59-130985. In FIG. 2, the output voltage level of the transmitted wave is equal to $H_1$. When the road surface is hard as in a concrete road, the intensity of the reflected wave is high so that the input voltage of the reflected wave is at a relatively high level $H_2$. When the road surface is soft as in a snow-covered road, the intensity of the reflected wave is low so that the input voltage is at a lower level $H_3$. The control unit 6 of this embodiment determines whether the road surface is slippery or not by checking whether the input voltage of the reflected wave is lower than a predetermined value $H_c$. If the control unit 6 decides that the intensity of the reflected wave is lower than the predetermined value $H_c$ and therefore the road surface is in a slippery condition, then the control unit 6 produces the output signal in the high level to change the drive system from the 2WD mode to the 4WD mode. Therefore, the drive system is changed to the 4WD mode before occurrence of wheel slip, and independent of slip of the wheels of the drive pair and enables the vehicle to corner stably with little slippage even on a snow-covered road.

If the intensity of the reflected wave becomes higher than the predetermined value $H_c$, the control unit 6 delivers the output signal at the low level and returns the drive system to the 2WD mode.

FIG. 9 shows one example of the control process performed by the road surface condition sensing system 1.

At a step 51, the system 1 transmits a pulse of ultrasonic wave every 10 msec, for example. At a step 52, the sensing system 1 detects the start of a rise of an echo signal of the reflected wave. At a step 53, the sensing system 1 reads the voltage of the echo signal at the expiration of a 0.5 msec interval from the start of the rise of the echo signal in order to obtain the value approximate to the peak value of the echo signal. At a step 54, the control unit 6 of the sensing system 1 determines whether the measured voltage V of the echo signal is equal to or lower than a predetermined lower level L (1.5 V, for example). If it is, the control unit 6 increments (increases by one) a 4WD COUNT at a step 55, and then proceeds to a step 56. If it is not, the control unit 6 directly proceeds to the step 56. At the step 56, the control unit 6 determines whether the measured voltage V of the echo signal is equal to or higher than a predetermined upper level H (3 V, for example). If it is, the control unit 6 increments a 2WD COUNT at a step 57, and then proceeds to a step 58. If it is not, the control unit 6 proceeds to the step 58 directly. At the step 58, the control unit 6 determines whether the number of times of ultrasonic emission reaches a predetermined number T which is set equal to 128 (corresponding to 1.28 sec), for example. If the number of times is lower than the predetermined number T (128, for example), then the control unit 6 returns to the step 51. If the number of times is equal to or higher than the predetermined number T, then the control unit 6 determines whether the 4WD COUNT is equal to or higher than a predetermined number $N_1$ or not, at a step 59. If the answer of the step 59 is affirmative, the control unit 6 delivers the 4WD command signal, at a step 60, and then repeates the control process from the beginning. If the answer of the step 59 is negative, the control unit 6 determines whether the 2WD COUNT is equal to or higher than a predetermined number $N_2$ or not, at a step 61. If it is, the control unit 6 delivers the 2WD command signal at a step 62, and then repeats the control process from the beginning. If it is not, the control unit 6 returns directly to the step 51 to repeat the process.

In order to detect not only a snow-covered road but also a muddy road, it is preferable to position the ultrasonic transmitter and receiver above a track of one of the road wheels of the vehicle, as shown in FIGS. 3 and 4. In the example shown in FIGS. 3 and 4, the transmitter 23 and receiver 24 (electroacoustic transducers) are fixed to an underside of a rear bumper 25 behind one of the rear wheels 13 at such a position that a rut of the wheel 13 is formed right below the transmitter and receiver 23 and 24. When a mud 26 is covered with a dry surface layer 27 as shown in FIG. 5, the intensity of the reflected wave is so high that the road surface sensing system 1 tends to decide in error that the road surface is normal. However, the mud 26 is uncovered by the rear wheel 13. Therefore, the transmitter and receiver 23 and 24 mounted on the underside of the rear bumper 25 can detect the ground surface condition correctly.

What is claimed is:
1. A vehicle comprising:
an engine,
first and second pairs of wheels
a four wheel drive system for transmitting power from said engine to said first and second pairs of wheels, said drive system comprising change-over means for selectively changing said drive system from a four wheel drive mode in which power is transmitted to all of said first and second pairs of wheels to a two wheel drive mode in which power is transmitted only to said first pair of wheels, and vice versa,
road surface condition sensing means for transmitting ultrasonic waves toward a road surface, receiving ultrasonic waves reflected back from the road surface and delivering an output signal when an intensity of the reflected ultrasonic waves is equal to or lower than a predetermined value, and
an actuator means for actuating said change-over means to change said drive system from the two wheel drive mode to the four wheel drive mode when the output signal is produced by said road surface condition sensing means independent of the slip of the wheels of the first pair.

2. A vehicle according to claim 1 wherein said road surface condition is surface hardness.

3. A vehicle comprising:

an engine, first and second pairs of wheels a four wheel drive system for transmitting power from said engine to said first and second pairs of wheels, said drive system comprising change-over means for selectively changing said drive system from a four wheel drive mode in which power is transmitted to all of said first and second pairs of wheels to a two wheel drive mode in which power is transmitted only to said first pair of wheels, and vice versa, road surface condition sensing means for transmitting a pulse of ultrasonic wave periodically toward a road surface, receiving waves reflected back from the road surface and measuring the intensity of the reflection periodically, determining an average value of a predetermined number of measured values of the intensity periodically and producing an output signal when the average value is equal to or lower than a predetermined value; and an actuator means for actuating said change-over means to change said drive system from the two wheel drive mode to the four wheel drive mode when the output signal is produced by said road surface condition sensing means.

4. A vehicle according to claim 3 wherein said road surface condition sensing means comprises an ultrasonic transmitter-receiver unit mounted on said vehicle behind one of said wheels at such a position that said road surface condition sensing means can sense a road surface condition within a track of one of said wheels.

5. A vehicle according to claim 4 wherein said first pair of wheels are front wheels and said second pair of wheels are rear wheels and wherein said transmitter-receiver unit is fixed to an underside of a rear bumper behind one of said rear wheels.

6. A vehicle according to claim 5 wherein said change-over means comprises a clutch for making and breaking a driving connection between said engine and said rear wheels.

* * * * *